United States Patent
Lindström et al.

(10) Patent No.: US 10,256,047 B2
(45) Date of Patent: Apr. 9, 2019

(54) DYE-SENSITIZED SOLAR CELL INCLUDING A POROUS INSULATION SUBSTRATE AND A METHOD FOR PRODUCING THE POROUS INSULATION SUBSTRATE

(71) Applicant: Exeger Operations AB, Stockholm (SE)

(72) Inventors: Henrik Lindström, Åkersberga (SE); Giovanni Fili, Stockholm (SE)

(73) Assignee: Exeger Operations AB, Stockholm (SE)

( * ) Notice: Subject to any disclaimer, the term of this patent is extended or adjusted under 35 U.S.C. 154(b) by 0 days.

(21) Appl. No.: 14/879,668

(22) Filed: Oct. 9, 2015

(65) Prior Publication Data

US 2016/0196926 A1    Jul. 7, 2016

Related U.S. Application Data

(62) Division of application No. 14/390,804, filed as application No. PCT/EP2013/054790 on Mar. 8, 2013, now Pat. No. 9,190,218.

(30) Foreign Application Priority Data

Apr. 4, 2012  (SE) ..................................... 1230033
Dec. 28, 2012  (SE) ..................................... 1200791

(51) Int. Cl.
*B32B 5/02*  (2006.01)
*B32B 5/26*  (2006.01)
(Continued)

(52) U.S. Cl.
CPC ............... *H01G 9/20* (2013.01); *B05D 7/544* (2013.01); *B32B 5/022* (2013.01); *B32B 5/024* (2013.01);
(Continued)

(58) Field of Classification Search
None
See application file for complete search history.

(56) References Cited

U.S. PATENT DOCUMENTS 3,949,130  A  *  4/1976  Sabee .................... D04H 3/16
                                              428/192
4,272,318  A  *  6/1981  Walker ................ B01D 27/005
                                              162/382

(Continued)

FOREIGN PATENT DOCUMENTS

CN      1206504 A      1/1999
CN      1316111 A      10/2001
(Continued)

OTHER PUBLICATIONS

Hexcel (Reinforcement for Composites, Hexcel, Retrieved on Jul. 3, 2017, http://www.associatedindustriesinc.com/documents/hexcel/FabricHandbook.pdf).*

(Continued)

*Primary Examiner* — Francisco W Tschen
(74) *Attorney, Agent, or Firm* — Dilworth & Barrese, LLP

(57) ABSTRACT

The present invention relates to a dye-sensitized solar cell including a working electrode (1), a first conducting layer (3) for extracting photo-generated electrons from the working electrode, a porous insulation substrate (4) made of a microfibers, wherein the first conducting layer is a porous conducting layer formed on one side of the porous insulation substrate, a counter electrode including a second conducting layer (2) arranged on the opposite side of the porous substrate, and electrolyte for transferring electrons from the counter electrode to the working electrode. The porous insulation substrate comprises a layer (5) of woven microfibers and a layer (6) of non-woven microfibers disposed on (Continued)

the layer of woven microfibers. The present invention also relates to a method for producing a dye-sensitized solar cell.

17 Claims, 2 Drawing Sheets

(51) Int. Cl.
    *H01G 9/20*     (2006.01)
    *H01G 9/00*     (2006.01)
    *B05D 7/00*     (2006.01)

(52) U.S. Cl.
    CPC ............. *B32B 5/26* (2013.01); *H01G 9/0032* (2013.01); *H01G 9/2095* (2013.01); *B32B 2457/12* (2013.01); *H01G 9/2031* (2013.01); *H01G 9/2059* (2013.01); *Y02E 10/542* (2013.01)

(56) References Cited

U.S. PATENT DOCUMENTS

| | | | | |
|---|---|---|---|---|
| 4,293,378 | A * | 10/1981 | Klein | B01D 39/16 162/145 |
| 4,397,907 | A * | 8/1983 | Rosser | D04H 13/00 264/184 |
| 4,734,208 | A * | 3/1988 | Pall | B01D 39/2024 210/504 |
| 4,885,217 | A | 12/1989 | Hoge | |
| 5,300,165 | A | 4/1994 | Sugikawa | |
| 5,631,099 | A | 5/1997 | Hockaday | |
| 6,183,898 | B1 | 2/2001 | Koschany et al. | |
| 6,296,746 | B1 | 10/2001 | Broman et al. | |
| 2001/0003618 | A1* | 6/2001 | Kato | C08G 63/183 428/395 |
| 2002/0123283 | A1* | 9/2002 | Dyer | A41D 31/0033 442/181 |
| 2003/0121857 | A1* | 7/2003 | Kurth | B01D 61/027 210/651 |
| 2003/0177909 | A1* | 9/2003 | Koslow | A61L 2/0017 96/154 |
| 2003/0207628 | A1 | 11/2003 | Pierce | |
| 2004/0217049 | A1* | 11/2004 | Bayer | B01D 39/16 210/500.36 |
| 2004/0224594 | A1 | 11/2004 | Choi et al. | |
| 2005/0197686 | A1* | 9/2005 | Vlad | B63C 11/04 607/149 |
| 2006/0166582 | A1 | 7/2006 | Turkson | |
| 2007/0028767 | A1* | 2/2007 | Choi | B01D 39/1692 95/59 |
| 2008/0011350 | A1* | 1/2008 | Luch | H01L 31/02242 136/249 |
| 2008/0213671 | A1 | 9/2008 | Kogetsu et al. | |
| 2009/0241777 | A1* | 10/2009 | Kaukoniemi | B01D 46/0032 95/79 |
| 2010/0192851 | A1* | 8/2010 | Shah | B82Y 30/00 118/620 |
| 2011/0189518 | A1 | 8/2011 | Fujita et al. | |
| 2012/0085396 | A1 | 4/2012 | Tsuda et al. | |
| 2012/0305073 | A1 | 12/2012 | Hayase et al. | |
| 2013/0037089 | A1 | 2/2013 | Sasaki et al. | |

FOREIGN PATENT DOCUMENTS

| | | |
|---|---|---|
| CN | 1846327 A | 10/2006 |
| EP | 859386 A1 | 8/1998 |
| JP | 35-2290 A | 2/1960 |
| JP | 3-130394 A | 6/1991 |
| WO | 2007/134742 A2 | 11/2007 |
| WO | 2011/003987 A1 | 1/2011 |
| WO | 2011/016183 A1 | 2/2011 |
| WO | 2011/096154 A1 | 8/2011 |
| WO | 2011/135811 A1 | 11/2011 |

OTHER PUBLICATIONS

Kose et al. (Switching Surface Properties of Substrates by Coating with a Cellulose Nanofiber having a high adsorbability, Sen'l Gakkaishi, vol. 67, No. 7, 2011, pp. 163-168).*

* cited by examiner

DYE-SENSITIZED SOLAR CELL INCLUDING A POROUS INSULATION SUBSTRATE AND A METHOD FOR PRODUCING THE POROUS INSULATION SUBSTRATE

FIELD OF THE INVENTION

The present invention relates to a dye-sensitized solar cell including a porous insulation substrate made of microfibers, having a first conducting layer formed on one side of the porous insulation substrate, and a second conducting layer arranged on the opposite side of the porous substrate. The present invention further relates to a porous insulation substrate for a dye-sensitized solar cell. The present invention also relates to a method for producing the porous insulation substrate and the conducting layers.

PRIOR ART

Dye-sensitized solar cells (DSC) have been under development for the last 20 years and work on similar principles as photosynthesis. Unlike silicon solar cells, these cells obtain energy from sunlight using dyes which can be manufactured cheap, environmentally unobtrusive and in abundance.

A conventional sandwich type dye-sensitized solar cell has a few μm thick porous $TiO_2$ electrode layer deposited onto a transparent conducting substrate. The $TiO_2$ electrode comprises interconnected $TiO_2$ metal oxide particles dyed by adsorbing dye molecules on the surface of the $TiO_2$ particles and forming a working electrode. The transparent conducting substrate is normally a transparent conducting oxide deposited onto a glass substrate. The transparent conducting oxide layer serves the function as a back contact extracting photo-generated electrons from the working electrode. The $TiO_2$ electrode is in contact with an electrolyte and another transparent conducting substrate, i.e. a counter electrode.

Sunlight is harvested by the dye, producing photo-excited electrons that are injected into the conduction band of the $TiO_2$ particles and further collected by the conducting substrate. At the same time, $I^-$ ions in the redox electrolyte reduce the oxidized dye and transport the generated electron acceptors species to the counter electrode. The two conducting substrates are sealed at the edges in order to protect the DSC modules against the surrounding atmosphere, and to prevent the evaporation or leakage of the DSC components inside the cell.

WO 2011/096154 discloses a sandwich type DCS module including a porous insulation substrate, a working electrode including a porous conducting metal layer formed on top of the porous insulation substrate and creating a back contact, and a porous semiconductor layer containing an adsorbed dye arranged on top of the porous conducting metal layer, a transparent substrate facing the porous semiconductor layer, adapted to face the sun and to transmit the sun light to the porous semiconductor layer. The DSC module further includes a counter electrode including a conducting substrate arranged on a side opposite to the porous semiconductor layer of the porous insulation substrate, and at a distance from the porous insulation substrate, thereby forming a space between the porous insulation substrate and the conducting substrate. An electrolyte is filled in the space between the working electrode and the counter electrode. The porous conducting metal layer may be created using a paste including metallic or metal based particles, which is applied on top of the porous insulation substrate by printing, and followed by heating, drying and baking. An advantage with this type of DSC module is that the conducting layer of the working electrode is arranged between the porous insulation substrate and the porous semiconductor layer. Thus, the conducting layer of the working cell does not have to be transparent, and can be made of a material of high conductivity, which increases the current-handling capability of the DSC module and ensures high efficiency of the DSC module.

There are high demands on the porous insulation substrate. An ideal porous insulation substrate must fulfill the following requirements:

The substrate must have sufficient mechanical strength to withstand the mechanical handling and processing. During the processing of the DSC the substrate is subjected to mechanical handling such as: cutting processes, stacking and de-stacking processes, printing processes, drying processes, air/vacuum sintering processes, sealing processes, etc. Substrates with poor mechanical strength can suffer damage during handling and processing, resulting in defect solar cells, which lower the manufacturing yield.

The substrate must have sufficient high temperature resistance and exhibit low mechanical deformation and/or small loss in mechanical stability after high temperature treatment. During processing the substrate is subjected to temperatures of 500° C. in air and (580-650)° C. in vacuum or inert atmosphere. The substrate must withstand temperatures in air up to 500° C. without significant mechanical deformation or loss in mechanical stability. The substrate must withstand temperatures in vacuum or inert atmosphere of at least up to 580° C. or higher without significant mechanical deformation or loss in mechanical stability.

The substrate must be chemically inert to high temperature processing. During the various high temperature treatments the substrate is exposed to, e.g., hot air, hot air containing organic solvents, hot air containing organic combustion products and to hydrogen gas. The substrate must be chemically inert to all these high temperature treatments and not react chemically to produce compounds that could be harmful for the DSC.

The substrate must withstand the chemicals used in the DSC. The DSC contains active substances such as, e.g., organic solvents, organic dyes, and ions such as $I^-$ and $I^{3-}$ etc. In order to have a good performance stability and life time of the DSC the substrate must not react with the active substances of the DSC to alter the chemical composition of the DSC or produce compounds that could be harmful for the DSC.

The substrate must allow for fast transport of ions between the electrodes. In order to have fast ion transport between the electrodes, the substrate must have sufficiently high porosity (pore volume fraction) and low tortuosity.

The substrate has to be electrically insulating. This is to prevent electrical short circuit between the counter electrode and the current collector.

The distance between the counter electrode and the working electrode is affected by the thickness of the substrate. The distance between the counter electrode and the working electrode should be as small as possible such that the transport of ions between the counter electrode and working electrode is as fast as possible. Therefore, the thickness of the substrate should be as thin as possible.

The substrate must have sufficient capacity to block the conductive particles in the printing ink from seeping through the substrate. In order to avoid electrical short circuit between conducting layers printed on both sides of the substrate, the substrate must be able to block the conductive particles printed on one side of the substrate from seeping through to the other side of the substrate.

To summarize, the porous insulation substrate must allow ions to pass through the substrate and prevent particles to pass through the substrate, and must have sufficient mechanical properties.

In WO 2011/096154 it is proposed to use a molded fiber glass compact as the porous insulation substrate. The molded fiber glass compact can be woven glass fabric containing glass fibers, or non-woven fiberglass in the form of a sheet having glass fibers, which are joined by suitable means.

By using high temperature compatible glass based substrates it is possible to fulfill most of the above requirements. However, if the substrate is made of non-woven microglass fibers, the substrate has to be made very thick in order to withstand the mechanical handling and processing during manufacturing of the solar cell. This is due to the fact that non-woven glass microfibers have very poor mechanical properties, and accordingly, substrates based on non-woven glass microfibers must be produced with very high thicknesses in order to increase their mechanical stability. A substrate with high thickness leads to a large distance between the counter electrode and the working electrode, and accordingly, to a very slow transport of ions between the counter electrode and working electrode.

Woven glass fibers, i.e. glass fabric, include woven yarns of glass microfibers, where each glass fiber yarn consists of multiple glass microfibers. Woven glass fibers are inherently mechanically stronger compared to non-woven glass fibers. Additionally, the thickness of woven fibers can be made very thin with maintained mechanical strength. However, woven fibers often have large holes between the woven yarns, which cause a large amount of particles in printed inks to pass right through the substrate in an uncontrolled way across the entire area of the woven fiber causing electrical short circuit between the counter electrode and current collector. Thus, the holes in the fabric make it difficult to apply an ink including metallic or metal based particles on both sides of the porous insulation substrate without creating an electrical short-circuit, unless the particles are much larger than the holes. However, having such large particles in the ink makes the conducting metal layers too thick. Thick conducting metal layers will increase the distance between the counter electrode and the working electrode resulting in a slower ion transport between the counter electrode and the working electrode.

OBJECT AND SUMMARY OF THE INVENTION

The object of the present invention is to provide a dye-sensitized solar cell having a porous insulation substrate that fulfills the above-mentioned requirements.

This object is achieved with a dye-sensitized solar cell as defined herein.

The dye-sensitized solar cell includes a working electrode, a first conducting layer for extracting photo-generated electrons from the working electrode, a porous insulation substrate made of microfibers, wherein the first conducting layer is a porous conducting layer formed on one side of the porous insulation substrate, a counter electrode including a second conducting layer arranged on the opposite side of the porous substrate, and electrolyte for transferring electrons from the counter electrode to the working electrode. The solar cell is characterized in that the porous insulation substrate comprises a layer of woven microfibers and a layer of non-woven microfibers disposed on the layer of woven microfibers on a first side of the substrate.

A microfiber is a fiber having a diameter less than 10 µm and larger than 1 nm.

We have found that by combining the properties of woven and non-woven microfibers, it is possible to achieve all the above requirements for an ideal porous insulation substrate. A woven fabric can be made very thin and mechanically very strong, but it contains large holes between the woven yarns. On the other hand, the non-woven microfiber is mechanically weak, but has excellent filtering properties that blocks conductive particles in the printing ink from seeping through the porous insulation substrate. By depositing a thin layer of non-woven microfibers on top of a layer of woven microfibers, it is possible to prevent the particles in the inks from passing right through the woven fiber, and it is possible to achieve all the above requirements. The thin fragile layer of non-woven microfibers is mechanically stabilized by the supporting layer of woven microfibers.

According to an embodiment of the invention, the first conducting layer is disposed on the layer of non-woven microfibers. The non-woven layer provides a smooth surface on the substrate, suitable for applying a smooth conducting layer on the substrate by printing.

According to an embodiment of the invention, the layer of woven microfibers comprises yarns with holes formed between the individual woven yarns, and at least a part of the non-woven microfibers are accumulated in the holes between the yarns. Thus, the thickness of the layer of non-woven microfibers varies in dependence of the locations of the holes in the woven layer of microfibers, such that the layer of non-woven microfibers is thicker in the holes in the layer of woven microfibers and thinner on top of the yarns of layer of woven microfibers. The layer of non-woven microfibers protrudes into the holes between the yarns. This embodiment reduces the thickness of the layer of non-woven microfibers and makes it possible to provide a thin substrate. Thereby, the distance between the counter electrode and the working electrode becomes small and the transport of ions between the counter electrode and working electrode becomes fast. The thickness of the substrate becomes significantly reduced compared to providing a uniformly thick layer of non-woven microfibers on top of a sheet of woven fibers, such as stacking a sheet of non-woven fibers on top of a sheet of woven fibers.

According to an embodiment of the invention, the porous insulation substrate comprises a second layer of non-woven microfibers arranged on the layer of woven microfibers on a second side of the substrate. By providing a second layer of non-woven microfibers on the other side of the layer of woven microfibers, a symmetrical and more mechanically stable substrate is achieved, and the substrate is prevented from curling during the heat treatment during the manufacturing of the solar cell. Additionally, the second layer of non-woven microfibers further enhances the blocking of conductive particles in the inks from passing right through the woven fibers. This embodiment provides a smooth surface on both sides of the substrate and thus makes it possible to apply smooth conducting layers on both sides of the substrate by printing. Preferably, the second conducting layer is disposed on the second side of the substrate on the second layer of non-woven microfibers.

According to an embodiment of the invention, the layer of woven microfibers is made of woven yarns including a plurality of microfibers, in the following denoted filaments, and the diameter of the microfibers in the layer of non-woven microfibers is smaller than the diameter of the filaments in the layer of woven microfibers. This embodiment enables the fibers to accumulate in the holes between the yarns and thus block the holes.

According to an embodiment of the invention, the layer of woven microfibers is made of ceramic microfibers, such as a glass fabric. Ceramic microfibers are mechanically very strong and can be made very thin and still be strong enough. Ceramic microfibers can also withstand the high temperatures used in the heat treatment of the solar cell during the manufacturing procedure. Ceramic microfibers are fibers made of a refractory and inert material, such as glass, silica ($SiO_2$), alumina ($Al_2O_3$), aluminosilicate and quartz.

According to an embodiment of the invention, the layer of non-woven microfibers is made of ceramic microfibers, such as non-woven glass microfibers. The ceramic microfibers can withstand the high temperatures used in the heat treatment of the solar cell during the manufacturing procedure.

According to an embodiment of the invention, the thickness of the layer of woven microfibers is between 4 μm and 30 μm, preferably between 4 μm and 20 μm and more preferably between 4 μm and 10 μm. Such a layer provides the required mechanical strength at the same time as it is thin enough to enable a fast transport of ions between the counter electrode and working electrode.

According to an embodiment of the invention, the microfibers in the layer of non-woven microfibers have a diameter of less than 4 μm, preferably less than 1 μm, and more preferably less than 0.5 μm. The use of very thin fibers reduces the thickness of the layer of non-woven microfibers and accordingly the thickness of the substrate. Further, the thin fibers efficiently block the holes in the layer of woven microfibers and prevent conductive particles from seeping through the substrate and thus prevent the formation of an electrical short circuit.

A further object of the present invention is to provide a porous insulation substrate that fulfills the above mentioned requirements. This object is achieved with a porous insulation substrate. The porous insulation substrate comprises a layer of woven microfibers and a layer of non-woven microfibers disposed on the layer of woven microfibers. Preferably, the woven microfibers are made of ceramic microfibers. The further features described above related to the porous insulation substrate of the solar cell are also applicable to the porous insulation substrate itself.

According to an embodiment of the invention, the layer of woven microfiber and the layer of non-woven microfibers are made of ceramic microfibers, such as glass microfibers. Ceramic microfibers are mechanically very strong and can be made very thin and still be strong enough.

According to another embodiment of the invention, the layer of non-woven microfibers comprises organic microfibers. Organic microfibers are fibers made of organic materials, such as polymers, for example, polycaprolactone, PET, or PEO, and cellulose, for example nanocellulose (MFC) or wood pulp. It is possible to use organic microfibers in the layer of non-woven microfibers. Organic microfibers cannot withstand the high temperatures used in the heat treatment during manufacturing of a dye sensitized solar cell. However, organic microfibers can serve the purpose of blocking the conductive particles in the inks from seeping right through the woven fibers during printing and drying of the inks on the porous insulating substrate, thereby reducing the risk of electrical short circuit. The organic microfibers are then removed during heat treatment at higher temperatures. Organic fibers are more flexible and not as fragile as ceramic fibers. Thus, by adding organic fibers, the mechanical strength of substrate increases, which for example is advantageous during a printing and drying process.

According to a further embodiment of the invention, the layer of non-woven microfibers comprises organic microfibers and ceramic microfibers. The layer of non-woven microfibers is made of organic and ceramic microfibers. An advantage of mixing organic microfibers and ceramic microfibers in the layer of non-woven microfibers is that the organic microfibers are thinner than the ceramic microfibers, thereby creating a nano-network of organic fibers inside a micro network of ceramic fibers and by that reducing the size of the holes in the micro network. The organic fibers fill up the holes between the microfibers thereby improving the ability to block the particles in the ink and thus avoiding short circuit. Further, by mixing organic microfibers and ceramic microfibers in the layer of non-woven microfibers, the mechanical strength of the substrate is improved compared to only having ceramic microfibers in the substrate.

Another object of the present invention is to provide a method for producing a porous insulation substrate that fulfills the above mentioned requirements and a porous conducting layer formed on the insulation substrate.

This object is achieved by a method as defined herein.
The method comprises:
a) producing the porous insulation substrate by providing a fabric of woven microfibers comprising yarns with holes formed between them, preparing a fiberstock solution by mixing liquid and microfibers, covering a first side of the fabric with the fiberstock solution, draining liquid from the fiberstock solution through the holes in the fabric, and drying the wet fabric with the microfibers disposed on the fabric, and
b) depositing an ink comprising conductive particles on one side of the insulation substrate to form a porous conducting layer.

By draining the liquid from the fiberstock solution through the holes in the fabric, the microfibers follow the liquid and a main part of the non-woven microfibers are accumulated in the holes between the yarns, and accordingly, the size of the holes between the yarns is reduced. This method makes it possible to manufacture an insulation substrate, which is compact enough to prevent the conductive particles in the ink from passing through the substrate and thin enough to allow a fast transport of ions between the counter electrode and working electrode. The layer of non-woven fibers on top of the layer of woven fibers provides a smooth surface to print.

According to an embodiment of the invention, the fabric is made of woven ceramic microfibers, and said fiberstock solution is prepared by mixing liquid and ceramic microfibers.

According to an embodiment of the invention, the fiberstock solution is prepared by mixing liquid and organic microfibers.

According to an embodiment of the invention, the fiberstock solution is prepared by mixing liquid, ceramic microfibers, and organic microfibers.

The ink is deposited on top of the disposed microfibers to form a porous conducting layer on a first side of a porous insulation substrate. According to an embodiment of the invention, step a) further comprises covering a second side of the fabric with the fiberstock solution, and draining the liquid from the fiberstock solution through the holes in the fabric, and step b) further comprises: depositing the ink on the second side of the fabric on top of the disposed microfibers, to form a porous conducting layer on a second side of the porous insulation substrate. This embodiment provides a smooth surface on both sides of the substrate and thus makes it possible to apply smooth conducting layers on both sides of the substrate by printing.

According to an embodiment of the invention, step a) further comprises adding a binder to the fiberstock solution. The addition of a binder to the fiberstock solution enhances the binding of non-woven fibers to each other and enhances the binding of non-woven fibers to the fabric. Further, adding a binder to the fiberstock solution makes it possible to reduce the amount of fiber added to the solution to achieve a satisfactory coverage of the holes in the fabric. Examples of binders are, e.g., polyvinyl alcohol (PVA), starch, carboxymethyl cellulose (CMC) and nanocellulose, i.e., so called microfibrillated cellulose (MFC).

According to an embodiment of the invention, the method further comprises adding one or more additives selected from a group including a surfactant, a dispersant, a wetting agent, a defoamer, a retention aid, and a rheology changing agent, to the fiberstock solution. By using additives, it is possible to manufacture a thinner and denser substrate with smaller holes.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
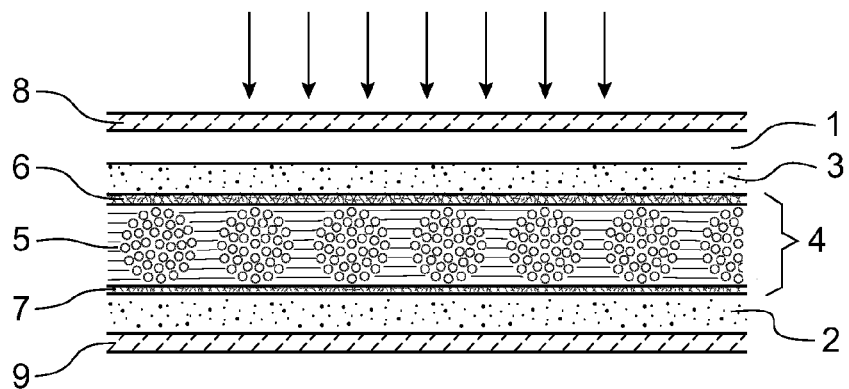
FIG. 1 shows a cross section through a dye-sensitized solar cell module according to an embodiment of the invention.

The invention will now be explained more closely by the description of different embodiments of the invention and with reference to the appended figures. FIG. 1 shows a cross section through a dye-sensitized solar cell (DSC) according to an embodiment of the invention. The DSC disclosed in FIG. 1 is of a monolithic type. The DSC comprises a working electrode 1 and a counter electrode 2. The space between the working electrode and the counter electrode is filled with an electrolyte including ions for transferring electrons from the counter electrode to the working electrode. The DSC module comprises a conducting layer 3 for extracting photo-generated electrons from the working electrode 1. The conducting layer 3 serves as a back contact and is in the following named the back contact layer. The working electrode 1 includes a porous $TiO_2$ electrode layer disposed onto the back contact layer 3. The $TiO_2$ electrode comprises $TiO_2$ particles dyed by adsorbing dye molecules on the surface of the $TiO_2$ particles. The working electrode is positioned on a top side of the DCS module. The top side should be facing the sun to allow the sunlight to hit the dye molecules of the working electrode.

The DSC module further includes a porous insulation substrate 4 arranged between the working electrode 1 and the counter electrode 2. The porosity of the porous insulation substrate will enable ionic transport through the substrate. For example, the porous insulation substrate 4 is made of a ceramic microfiber, such as glass microfibers. Substrates made of ceramic microfibers are electrical insulators, but are porous and thereby allowing liquids and electrolyte ions to penetrate. The ceramic microfibers are cheap, chemically inert, can withstand high temperatures and are simple to handle in various process steps.

The porous insulation substrate 4 comprises a layer of woven microfibers 5 and a first layer of non-woven microfibers 6 disposed on the layer of woven microfibers 5 on a first side of the substrate. This makes it possible to provide a thin and strong substrate. The back contact layer 3 is a porous conducting layer disposed on the first side of the substrate on the layer of non-woven microfibers 6. In the embodiment disclosed in FIG. 1, the substrate further comprises a second layer of non-woven microfibers 7 disposed on the layer of woven microfibers 5 on a second side of the substrate. By providing layers of non-woven microfibers on both sides of the layer of woven microfibers, a symmetrical substrate is achieved. This may prevent the substrate from curling during the heat treatment during the manufacturing of the solar cell, and additionally contributes to prevent the particles in the printed ink to pass through the layer of woven microfibers. The porous insulation substrate 4 will be described in more detail below with reference to FIG. 5.

The counter electrode includes a conducting layer 2, in the following named the counter electrode layer. In this embodiment, the conducting layer 2 is a porous conducting layer disposed on the second side of the porous insulation substrate 4 on top of the second layer of non-woven microfibers 7. When a porous conducting layer is used as a counter electrode, it is part of the counter electrode opposite to the working electrode. The back contact layer 3 and the counter electrode layer 2 are separated physically and electrically by the porous insulation substrate 4. However, the back contact layer and the counter electrode layer are electrically connected via ions penetrating the porous insulation substrate. The porous conducting layers 2,3 may be created using an ink including metallic or metal based particles, which are applied on top of the porous insulation layer 4 by printing, and followed by heating, drying and baking. The particles are typically between 0.1-10 μm. preferably between 0.5-2 μm.

The DSC also includes a first sheet 8 covering a top side of the DSC module and a second sheet 9 covering a bottom side of the DSC module and acting as barriers in order to protect the DSC modules against the surrounding atmosphere, and to prevent the evaporation or leakage of the DSC components inside the cell. The first sheet 8 on the top side DSC module covers the working electrode and needs to be transparent, allowing light to pass through.

A thinner porous substrate is better, since a small distance between the working electrode and the counter electrode provides minimal losses in diffusion resistance of the electrolyte. However, if the substrate is too thin the mechanical strength of the substrate will be too low. Preferably, the thickness of the porous insulation substrate is larger than 4 μm and less than 100 μm. More preferably, the thickness of the porous insulation substrate is less than 50 μm. The thickness of the porous insulation substrate is typically between 10-30 μm.

In the following, an example of porous insulating substrate according to the invention will be described in more details. The porous insulate substrate is based on a layer of glass fabric made of woven yarn including a plurality of glass fibers. Woven fibers are much stronger than non-woven fibers. Additionally, a layer of woven fibers can be thin with maintained mechanical strength.

Figure 2:
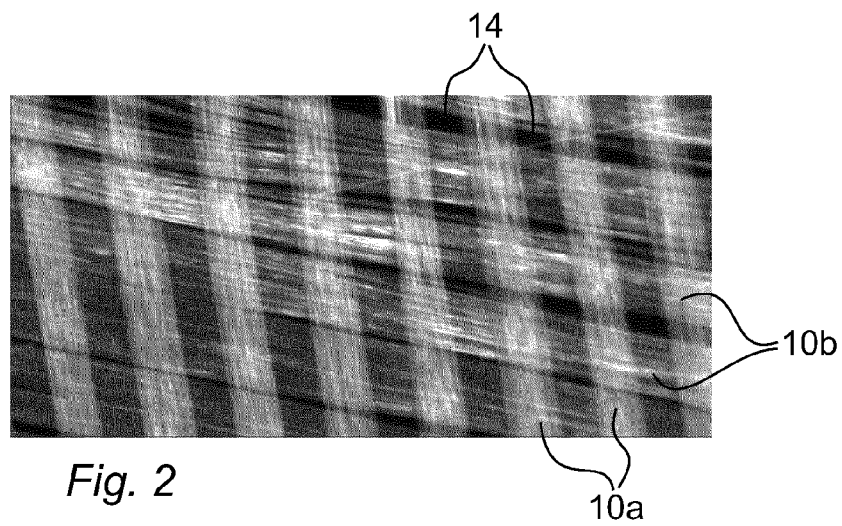
FIG. 2 shows an optical microscope picture of a glass fabric.

FIG. 2 shows an optical microscope picture of 15 μm thin glass fabric (Asahi Kasei E-materials). As can be seen in the figure, the glass fabric comprises woven yarn 10a-b of glass fibers. Each yarn includes a plurality of glass fibers, also denoted filaments. The diameter of a filament is typically 4-5 μm, and the number of filaments in the yarn is typically 50. The glass fabric has large holes 14 between the woven yarns, which would allow a large amount of the conductive particles in the printed ink to pass right through the woven fiber in an uncontrolled way. This is an unwanted effect. The size of the holes can be as large as 200 μm. In order to block the holes in the fabric, non-woven glass fibers are disposed on top of the fabric. This can be done by soaking the fabric in a solution containing glass fibers and then removing the liquid part of the solution.

Figure 3:
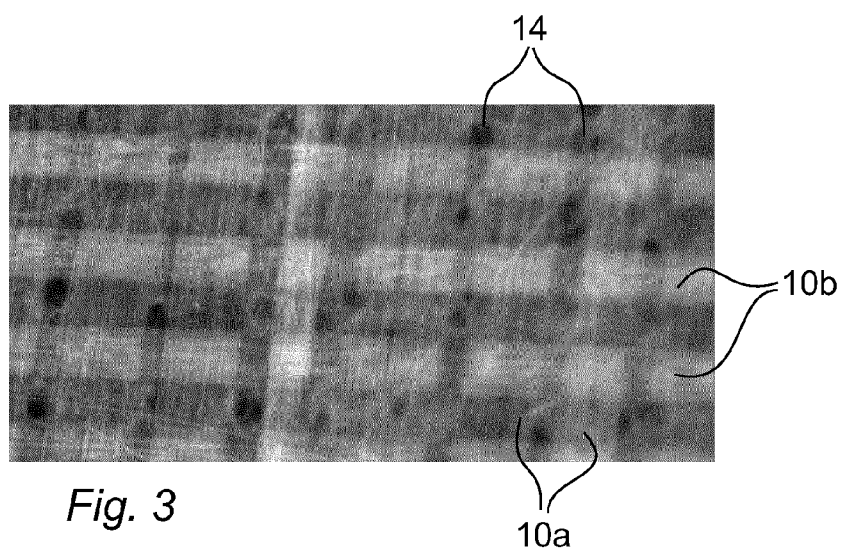
FIG. 3 shows an optical microscope picture of a glass fabric treated with 20 g glass microfiber stock solution on both sides.

FIG. 3 shows an optical microscope picture of the glass fabric shown in FIG. 2 treated with 20 gram glass microfiber stock solution on both sides, corresponding to 0.04 milligrams of deposited glass fiber per square centimeter on each side. As can be seen in the figure, the woven yarn in the glass fabric is covered by the disposed non-woven glass fibers. It can also be seen from FIG. 3 that the size of the holes in the fabric is reduced. However, full coverage of the holes in the glass fabric is not accomplished.

Figure 4:
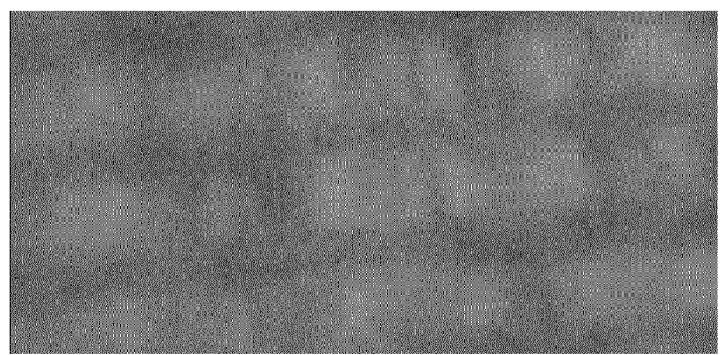
FIG. 4 shows an optical microscope picture of a glass fabric treated with 80 g glass microfiber stock solution on both sides.

FIG. 4 shows an optical microscope picture of the glass fabric shown in FIG. 2 treated with 80 gram glass microfiber stock solution on both sides, corresponding to 0.16 milligrams of deposited glass fiber per square centimeter on each side. As shown from FIG. 4, the holes are now covered by the glass microfibers. Obviously, full coverage of holes in the glass fabric can be achieved by increasing the amount of glass microfiber. Thus, by depositing non-woven glass fibers on top of the woven glass fibers it is possible to prevent that particles in the printed inks pass right through the woven fibers.

If a binder such as, e.g., inorganic binders such as, silicates, colloidal silica particles, silanes (e.g., linear silane or branched silane or cyclic silane), and colloidal $Al_2O_3$ is added to the fiberstock solution containing the glass fibers, the non-woven glass fibers can stick stronger to the woven fibers. Additionally, the layer consisting of deposited non-woven will be stronger mechanically as such. Consequently, by adding a binder to the fiberstock solution it is possible to form a mechanically strong non-woven layer that adheres strongly to the woven glass fibers.

EXAMPLE 1

In the following an example of a method for producing the porous substrate shown in FIG. 4 will be described. A 15 μm thin glass fabric (Asahi Kasei E-materials), as shown in FIG. 2, with 50 filaments, with a filament diameter of 4 μm, was laid on top of a stainless steel wire screen (33 cm×33 cm) in a hand sheet former and a stock cylinder was put on top of the glass fabric and then closed and tightened. A glass microfiber stock solution was prepared by mixing 4000 grams of distilled water and 8 grams of glass microfibers (Johns Manville, special purpose type glass microfiber type 90, fiber diameter: 0.2 μm) and 400 grams of water based colloidal silica (a solution containing around 15 wt. % SiO2 in water) such that the final silica concentration was 1.4 wt. %. The mixing was performed using an Ultraturrax batch dispenser. The stock cylinder of the hand sheet former machine was filled with distilled water (containing 1.4 wt. % silica) up to a level of 350 mm above the surface of the wire screen. In the next step 80 grams of glass microfiber stock was poured into the hand sheet former machine. The glass fiber stock and the distilled water containing silica were mixed by compressed air for 4 seconds and then allowed to settle for 6 seconds, after which the water was drained through the glass fabric and the wire screen. The wet treated glass fabric was dried at 110° C. in air in a belt oven. The glass fabric was then treated on the other side using the same process parameters as in the first treatment. The resulting substrate is shown in FIG. 4. As can be seen in FIG. 4, the woven yarn in the glass fabric is fully covered by the disposed non-woven glass microfibers. The thickness of the glass fabric with disposed glass microfibers was around 30 μm. This means that the total thickness of the two layers of non-woven microfibers is about 15 μm. By using a thinner glass fabric, it is possible to further reduce the thickness of the insulation substrate.

EXAMPLE 2

A variation of Example 1 is that the microfiber stock solution is prepared by mixing 4000 grams of distilled water and 200 grams of nanocellulose dispersion (water based nanocellulose dispersion containing 2% by weight of nanocellulose) and 400 grams of water based colloidal silica (a solution containing 15 wt. % SiO2 in water). Thus, the ceramic glass microfibers in the microfiber stock solution are replaced by organic microfibers consisting of nanocellulose. Using nano-cellulose simplifies the manufacturing process in that dipping can be used instead of using a paper manufacturing process.

EXAMPLE 3

Another variation of example 1 is that the microfiber stock solution is prepared by mixing 4000 grams of distilled water and 2 grams of glass microfibers (Johns Manville, special purpose type glass microfiber type 90, fiber diameter: 0.2 μm) and 200 grams of nanocellulose dispersion (water based nanocellulose dispersion containing 2% by weight of nanocellulose) and 400 grams of water based colloidal silica (a solution containing 15 wt. % SiO2 in water). Thus, both organic microfibers consisting of nanocellulose and ceramic microfibers consisting of glass are used in the microfiber stock solution. After the porous insulation substrate has been dried, ink with conductive particles is deposited on at least one side of the substrate on top of the layer of non-woven microfibers, to form a porous conducting layer on the porous insulation substrate. If a monolithic DCS module is to be manufactured, the ink is deposited on both sides of the substrate on top the layers of non-woven microfibers, to form a porous conducting layer on each side of the porous insulation substrate. However, if a sandwich type DCS module is to be manufactured, the ink with conductive particles is only deposited on one side of the substrate.

To make sure that the fibers in the microfiber stock solution is properly dispersed it is advantageous to add additives to the distilled water before mixing water and the microfibers. Examples of suitable additives are surfactants, dispersants, wetting agents, retention aids, defoamers, and rheology changing agents. It is advantageous to add one or more of those additives. The additives are burnt away during the following steps of the manufacturing process of the solar cell, and consequently do not remain in the end product. The purpose of the additives is to achieve individual and nonagglomerated fibers, so that the individual fibers can be deposited as homogeneously as possible in order to provide a thin and at the same time dense layer of individual fibers. Thus, by using additives, it is possible to manufacture a thinner and denser substrate with smaller holes.

By adding surfactants to the fiberstock solution and to the dilution water, a smoother and more homogeneous microfiber deposition can be accomplished. Further, it is advantageous to add a wetting agent to the fiberstock solution so that the dilution water wets the fibers and the fabric. Also, by adding a water soluble polymer to the fiberstock solution and the dilution water, a smoother and more homogeneous microfiber deposition can be accomplished. However, it was found that, when adding polymer it was necessary to add a defoaming agent in order to avoid excessive foaming during dilution water filling and agitation and draining cycles. It is also advantageous to add rheology changing additives to change the viscosity of the fiberstock solution and the dilution water.

It is also possible to add binders to the fiberstock solution and the dilution water to enhance the binding of non-woven fibers to each other and to enhance the binding of non-woven fibers to the fabric. Binders that can be used are e.g. inorganic binders such as, silicates, colloidal silica particles, silane, e.g. linear silane, branched silane, or cyclic silane, and colloidal $Al_2O_3$.

It is also possible to add retention aids to the fiberstock solution and the dilution water to improve the retention of the fibers in the porous insulation substrate as it is being formed. Nanocellulose can be used as a retention aid.

Figure 5:
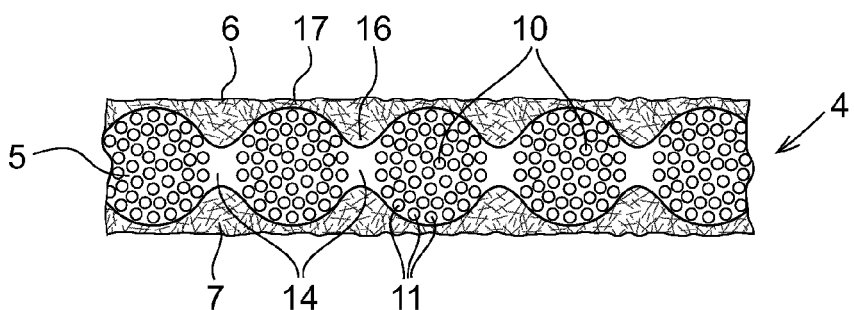
FIG. 5 shows a cross section through a porous insulation substrate according to an embodiment of the invention.

FIG. 5 shows a cross section through a porous insulation substrate 4 manufactured according to the method described in the example described above. The substrate has a layer 5 of woven microfibers including woven yarns 10 comprising a plurality of filaments 11 and holes 14 formed between the yarns 10. The woven yarns 10 are preferably made of ceramic microfibers. The substrate also includes two layers 6, 7 of non-woven microfibers arranged on each side of the layer 5 of woven microfibers. The layers 6, 7 of non-woven microfibers can be made of ceramic microfibers, organic microfibers or a combination thereof. As can be seen from the figure, a main part of the non-woven microfibers are accumulated in the holes 14 between the yarns 10. This is a consequence of the fact that the liquid from the fiberstock solution is drained through the holes formed in the fabric. This leads to that the thickness of the non-woven layers 6, 7 of microfibers varies in dependence on of the locations of the holes 14 in the woven layer of microfibers, such that the non-woven layer is thicker in the holes 14 in the woven layer and thinner on top of the yarns 17 of the woven layer. The side of the non-woven layer 6, 7 that faces away from the woven layer 5 is smooth, but the opposite side of the non-woven layer that faces against the woven layer is uneven and has thick parts 16 that protrude into the holes 14 of the woven layer and thin parts 17, which is are disposed on top of the yarns 10. The present invention can be used for monolithic as well as sandwich types of DCS.

The non-woven microfibers should preferably be thinner than the filaments in the layer of woven microfibers. Thus, if the diameter of the filaments is about 4 μm, the fibers in the layer of non-woven microfibers should have a diameter less than 4 μm, preferably less than 1 μm, and more preferably less than 0.5 μm in order to block the holes in an efficient way. The length of the non-woven fibers is, for example 100 nm-3 mm. For example, the diameter of nano-cellulose fibers is typically 5-10 nm and the length of the fibers is typically several μm. However, there also exist nano-cellulose fibers having a diameter of 10-20 nm and a length of several mm.

The present invention is not limited to the embodiments disclosed but may be varied and modified within the scope of the following claims. For example, the microfiber stock solution may include microfibers of different materials and diameters. Although, the examples above use glass microfibers, the invention is not limited to glass microfibers. It is possible to use other types of ceramic microfibers with similar properties. Further, the microfibers in the non-woven layer can be made of a different ceramic material than the microfibers in the woven layer. Further, the microfibers in the non-woven layer can be made of organic microfiber such as cellulose or polymer.

In an alternative embodiment, the substrate may include a layer of non-woven microfibers and a layer of woven microfibers laminated together.

In an alternative embodiment, the substrate has only one layer of non-woven microfibers, arranged on one side of a layer of woven microfibers. Although it is advantageous to have non-woven layers on both sides of the woven layer, it is not necessary. It is possible to deposit conducting layers on both sides of the substrate although only one of the sides of the woven layer has been provided with a layer of non-woven microfibers. The conducting layer can be printed on the non-woven layer as well as on the woven layer. A substrate having non-woven layers deposited on both sides of the woven layer can be covered with a conducting layer on one side as well as on both sides.

In an alternative embodiment, the porous insulation substrate has only one layer of non-woven microfibers, arranged on one side of a layer of woven microfibers and the conducting layer is deposited on the other side of the woven microfibers, i.e. the conducting layer is deposited on the woven microfibers and not on the non-woven microfibers.

The porous insulating substrate is a porous and chemically inert and high temperature resistant and electrically insulating material that can be used for other applications than in dye-sensitized solar cells. The substrate can be used in filtering/filter applications for removing, e.g. dust, organic or inorganic or biological micro particles, flour, sand, smoke, bacteria, and pollen.

The substrate can also be used as a separator, materially separating the cathode and anode in electrochemical- or photoelectrochemical devices such as fuel cells, batteries, electrochemical sensors, electrochromic displays, and photoelectrochemical solar cells.

The invention claimed is:

1. A solar cell comprising a porous electrically-insulating substrate (4) made of microfibers, and at least one conducting layer (3) comprising conductive particles, wherein
   the porous insulation substrate (4) is configured to block conductive particles printed on one side of the substrate (4) from seeping through to the other side of the substrate (4) and comprises a sheet (5) of nonconductive woven microfibers and a layer (6) of nonconductive non-woven microfibers disposed on the sheet (5) of woven microfibers on a first side of the sheet (5),
   the layer (5) of woven microfibers comprises yarns of woven microfibers separated by holes (14) therebetween,
   the layer (6) of non-woven microfibers has parts (16) deposited in and protruding into said holes (14) between the yarns of the woven microfibers layer (5),
   the thickness of the layer (6) of non-woven microfibers varies in dependence on the locations of the holes (14)

in the layer (5) of woven microfibers such that the layer (6) of non-woven microfibers is thicker (16) in said holes (14) and thinner (17) on top of the yarns of the layer (5) of woven microfibers, diameter of the microfibers in the layer (6) of nonwoven microfibers is smaller than diameter of filaments in the layer (5) of woven microfibers, with the nonwoven microfibers accumulating in the holes (14) between the yarns of woven microfibers and blocking the holes (14), and the at least one conducting layer (3) is disposed on the layer (6) of nonconductive non-woven microfibers.

2. The solar cell according to claim 1, wherein the porous insulation substrate (4) comprises a second layer (7) of non-woven microfibers disposed on a second side of the sheet (5) of woven microfibers.

3. The solar cell according to claim 1, wherein the sheet (5) of woven microfibers comprises yarns (10) including a plurality of filaments (11) and the diameter of said non-woven microfibers is smaller than the diameter of said filaments.

4. The solar cell according to claim 1, wherein said sheet (5) of woven microfibers is made of a glass fabric, and the fibres in said layer (6) of non-woven microfibers are made of glass.

5. The solar cell according to claim 1, wherein the thickness of said sheet (5) of woven microfibers is between 4 μm and 30 μm.

6. The solar cell according to claim 1, wherein the microfibers in the layer (6) of non-woven microfibers have a diameter less than 4 μm.

7. The solar cell according to claim 1, wherein said sheet (5) of woven microfibers and the layer (6) of non-woven microfibers are made of ceramic microfibers.

8. The solar cell according to claim 1, wherein said layer (6) of non-woven microfibers comprises organic microfibers.

9. The solar cell according to claim 1, wherein said layer (6) of non-woven microfibers are made of nanocellulose.

10. The solar cell according to claim 1, wherein said layer (6) of non-woven microfibers comprises organic microfibers and ceramic microfibers.

11. The solar cell according to claim 1, wherein said layer (6) of non-woven microfibers comprises organic microfibers and glass microfibers.

12. The solar cell according to claim 5, wherein the thickness of said sheet (5) of woven microfibers is between 4 μm and 20 μm.

13. The solar cell according to claim 12, wherein the thickness of said sheet (5) of woven microfibers is between 4 μm and 10 μm.

14. The solar cell according to claim 6, wherein the microfibers in the layer (6) of non-woven microfibers have a diameter less than 1 μm.

15. The solar cell according to claim 14, wherein the microfibers in the layer (6) of non-woven microfibers have a diameter less than 0.5 μm.

16. The solar cell according to claim 1, wherein a side of the layer (6) of non-woven microfibers facing away from the layer (5) of woven microfibers is smooth.

17. The solar cell according to claim 2, wherein sides of the layers (6, 7) of non-woven microfibers facing away from the layer (5) of woven microfibers are smooth.

* * * * *